UNITED STATES PATENT OFFICE.

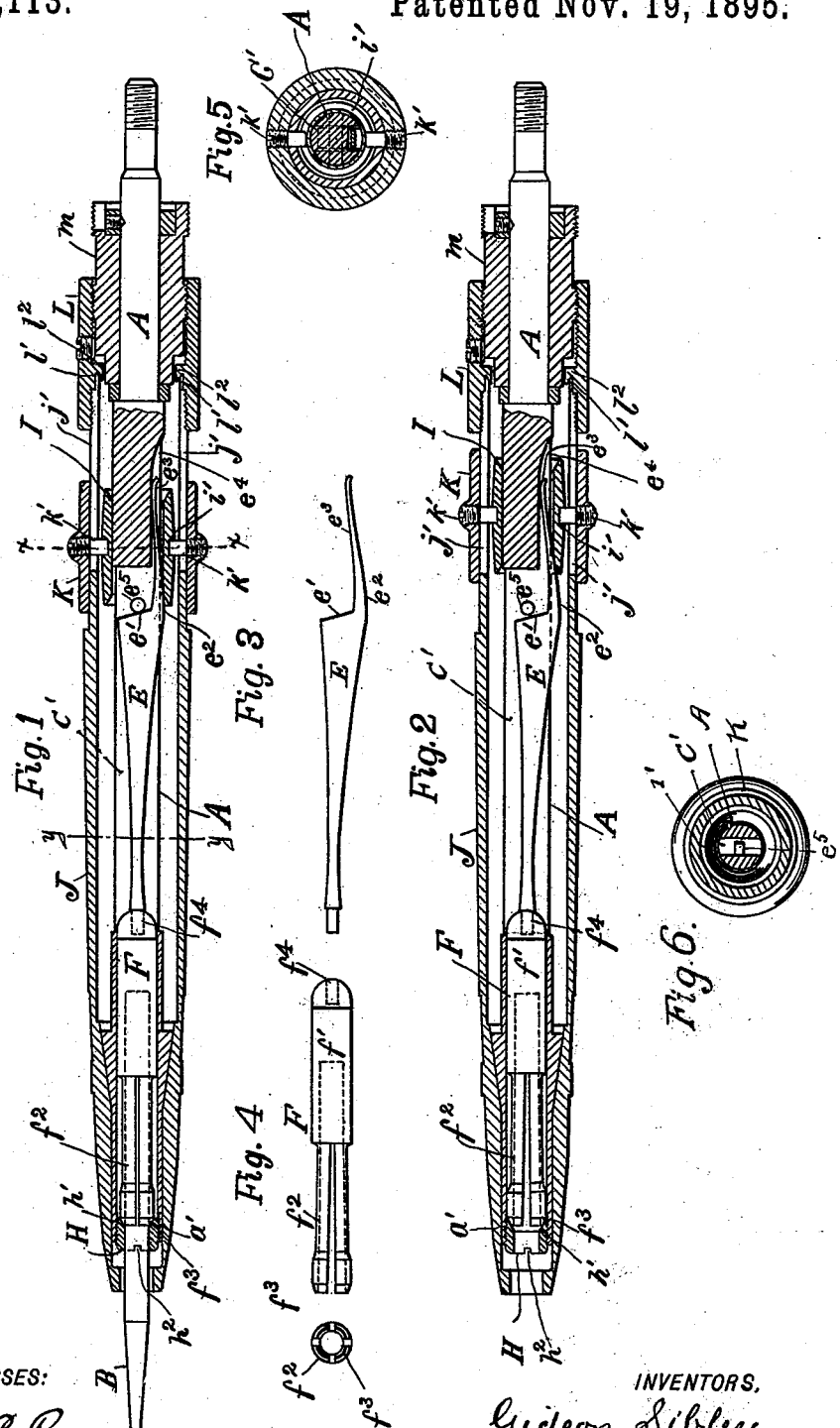

GIDEON SIBLEY AND ROBERT N. STOCKTON, OF PHILADELPHIA, PENNSYLVANIA, ASSIGNORS TO SAID SIBLEY.

HANDPIECE FOR DENTAL ENGINES.

SPECIFICATION forming part of Letters Patent No. 550,113, dated November 19, 1895.

Application filed June 14, 1894. Serial No. 514,518. (No model.)

*To all whom it may concern:*

Be it known that we, GIDEON SIBLEY and ROBERT N. STOCKTON, citizens of the United States, and residents of the city and county of Philadelphia and State of Pennsylvania, have invented certain new and useful Improvements in Handpieces for Dental Engines, of which the following is a full, clear, and exact description, reference being had to the accompanying drawings, of which—

Figure 1 is a longitudinal section with the drill-holding mechanism in the closed position; Fig. 2, a similar section with the same parts in the open position; Fig. 3, a side elevation of the cam-arm device detached. Fig. 4 shows side and front elevations of the drill-chuck. Fig. 5 is a section on line $x\,x$, Fig. 1. Fig. 6 is a section on the line $y\,y$, Fig. 1, with the arm E removed.

The object of this invention is to provide an improved construction and combination of mechanism for securely holding and quickly and readily releasing for removal the drills or other working tools of handpieces for dental engines.

The construction and operation will clearly appear from the following description, and the novel features duly pointed out, reference being had to the annexed drawings.

In the drawings, A is the usual central spindle with a socket to receive the drill-holding chuck in the forward end and mounted in a suitable case or handle, in which it is adapted to be rotated by power applied to the rear end, the drill B being connected to the other end. The spindle is provided with a longitudinal slot $C'$ for the reception of the arm E, hereinafter described. The slot communicates with the opening or socket in the front end of the spindle.

F is the chuck for holding the shank of the drill. This chuck (shown detached in Fig. 4) consists of a cylindrical socketed rear portion $f'$ and spring-jaws $f^2$, four in the present instance. The forward or outer end $f^3$ of the jaws are made conical, as seen.

E is an arm within the slot of the spindle. It is made preferably of steel and has toward its rear end an inclined face or cam edge $e'$ and swells outwardly beyond the periphery of the spindle, thus forming a backward incline $e^2$. This rear end of the arm is in the present instance made thin or light, so that it will constitute a spring $e^3$, its extremity resting in the bottom of a groove $e^4$ in the side of the spindle. Adjacent to the cam edge $e'$ is a pin or abutment $e^5$ in the spindle, against which the said cam $e'$ is adapted to work, as hereinafter explained. The forward end of the arm E is adapted to engage a socket $f^4$ in the rear end of the drill-holding chuck F.

The forward end of the spindle A has on the inside a screw-thread $a'$ for securing thereto a threaded tubular nut H, whose inner end or edge $h'$ is beveled inwardly, as seen, to correspond and coact with the conical end of the jaws of the chuck. Its front or projecting end has a transverse slot $h^2$ for turning and so adjusting the nut by means of a screwdriver or the like.

Normally the chuck stands open, as in Fig. 2, sufficiently to allow the insertion of the shank of the drill. The extent of opening may, however, be nicely adjusted by means of the nut H, as obviously. When the latter is screwed up, its beveled edge engaging the conical end of the chuck-jaws will bring the jaws toward each other, and thus contract the orifice. This will clearly appear from the description hereinafter given of the operation of the parts.

The purpose of the arm E and adjuncts is to actuate the chuck in a manner to compel the jaws to firmly grasp the inserted drill-shank and to permit the release of the same when desired, so that it, the drill, may be taken out and another put in, both operations being capable of quick and ready accomplishment. Arm E is operated by means of a sleeve I, neatly fitting over and adapted to slide upon the spindle A, the rear or elastic end of the arm extending through the sleeve. By sliding the latter forward its front edge will press against the incline $e^2$ of the arm. The arm will move inwardly, causing the cam edge $e'$ to impinge against the abutment $e^5$. The arm E will be forced forward longitudinally, and consequently the chuck. The conical end of the latter thus coming against the inwardly-beveled end of nut H will cause the jaws of the chuck to grasp or bite the shank of the previously-inserted drill.

When the sleeve I is slid backward, as seen in Fig. 2, the elasticity of the spring end of the arm E will bring the cam edge $e'$ out of forcible contact with the abutment. The pressure upon the chuck, and consequently its grasp upon the drill, will be released, and the latter may be readily extracted. By reference to Fig. 1 it will appear that this spring end being compressed between the sleeve I and the spindle forms also a frictional lock for the said arm when the latter is acting against the chuck.

The spindle and adjuncts are inclosed in a suitable case or sheath J, upon which is a sliding sleeve K with opposite inwardly-extending pins $k'$, which enter a circumferential groove $i'$ in the cam-operating sleeve I. The case has two longitudinal end slits $j'$, through which the pins $k'$ extend in order to allow sleeve K to be slid to and fro. It will be obvious that the sliding of this sleeve will impart a corresponding movement to the sleeve I within the case.

The rear end of case J is secured to a coupling L, which is connected to the hollow cylindrical section $m$, in which the upper end of the spindle is rotatably secured. The usual mode of joining these two parts J and L is by a screw-thread connection. As, however, in the described construction of our device the case J is provided with slots $j'$, open at the rear end in order to allow the pins $k'$ to pass therein when the case is attached or removed, there is a certain yielding of the threaded end of the case, and consequently such connection is not reliable or durable. To obviate this defect we make a groove $l'$ in an offset $l^2$ on the inside of the coupling-pieces L, into which groove the free or slotted end of the case enters when the latter is screwed up, and thus maintains the end in position.

It is preferred to bevel the inner edge of the groove $l'$, as seen in the drawings, so that it will tend to expand the slotted end of the case, and thus keep the screw-threads of the latter in close engagement with those of the coupling L.

We remark that the part H for causing the jaws of the chuck to clamp the drill-shank, as described, may be fixed within the end of the spindle, or it may constitute an integral part thereof. It is, however, much preferable to have the same adjustable, in order especially to compensate for the wear of the parts which coact with the device.

We remark, further, that we do not limit our invention to the specific form or construction of the arm E and adjuncts shown. While the arm E, having its rear end provided with the inclined portion and the forward end of the arm engaging the rear end of the conical end chuck, together with the coacting beveled part H and the sliding sleeve I or equivalent devices are necessary elements of our improvement, it is not essential that the rear end of the arm shall be a spring, as the required outward or releasing movement of the lever may be otherwise obtained by the backward movement of the sleeve I by suitable connection thereof with arm E, nor is it absolutely necessary that the cam edge $e'$ shall be employed, as obviously a similar result—that is, the desired movement of the said arm—may be secured by having the end of the elastic part thereof rest against a suitable stop or abutment, whereby when the sleeve is slid forward the inclined arched spring will be flattened, and the arm being thus practically lengthened, its front end will be forced against the chuck. Although we have shown the chuck and arm E separate, they may sometimes be integral.

Having thus described our invention, we claim as new and desire to secure by Letters Patent—

1. In a hand piece for dental engines, the combination with a longitudinally slotted spindle journaled to rotate within a suitable sheath or case, and a drill holding chuck seated in a socket of the said spindle and arranged to open and close by longitudinal movement, of an endwise movable arm seated longitudinally in the slot of said spindle and arranged to impinge directly against the said chuck, said arms having a lateral cam surface thereon, and a sliding part disconnected from the said arm and arranged to engage directly the said cam surface, said arm being adapted to slidingly engage a suitable abutment whereby such engagement causes a direct endwise movement of the arm and thereby of the chuck, substantially as specified.

2. In a hand piece for dental engines, the combination of the slotted rotatable spindle, having an abutment, the arm therein having the inclined end portion and a cam edge, as $e'$, arranged to co-act with said abutment, the chuck having the conical end jaws, and its rear end in contact with said arm, the beveled end part H, together with the sliding sleeve adapted to engage said inclined portion of said arm, substantially as specified.

3. In a hand piece for dental engines, the combination of the slotted rotatable spindle, the arm therein having an inclined portion as $e^2$, and the spring, the sliding sleeve adapted when moved forward to engage said incline, and at the same time to compress the spring, the chuck having the conical end jaws and its rear end in contact with said arm, together with the beveled end part H, said spindle and arm having means thereon for maintaining the arm in proper position, substantially as specified.

4. In a hand piece for dental engines, the combination with the sheath or case J, having therein the longitudinal slots $j'$, open at their rear ends, and the sliding sleeve K having pins which enter and play in said slots, of the coupling L threaded upon said sheath or case and having in its forward end an internal beveled groove which is arranged to receive and expand the slotted end of said sheath or case, substantially as specified.

5. In a hand piece for dental engines, the combination of a longitudinally slotted, rotatable spindle provided with a pin or abutment projecting into its slot, the arm therein having the rear inclined portion, as $e^2$, and a cam edge adapted to co-act with said pin or abutment, the sliding sleeve adapted to engage said inclined portion, the chuck having conical end jaws and its rear end in contact with said arm, means against which the chuck impinges at its forward end to close its jaws when moved by the said arm, the slotted case, and the sliding sleeve thereon, connected with the sleeve on the spindle, substantially as specified.

In testimony whereof we have hereunto affixed our signatures in the presence of two subscribing witnesses.

GIDEON SIBLEY.
ROBERT N. STOCKTON.

Witnesses:
THOMAS F. GROSS,
WM. WATSON.